US008236252B2

(12) United States Patent
Meissner et al.

(10) Patent No.: US 8,236,252 B2
(45) Date of Patent: Aug. 7, 2012

(54) COLLECTING MAIN FOR TUBULAR CRACKING FURNACES

(75) Inventors: Oliver Meissner, Gladbeck (DE); Silke Wodberg, Gevelsberg (DE)

(73) Assignee: Uhde GmbH, Dortmund (DE)

( * ) Notice: Subject to any disclaimer, the term of this patent is extended or adjusted under 35 U.S.C. 154(b) by 199 days.

(21) Appl. No.: 12/312,402

(22) PCT Filed: Oct. 30, 2007

(86) PCT No.: PCT/EP2007/009387
§ 371 (c)(1),
(2), (4) Date: Jan. 27, 2010

(87) PCT Pub. No.: WO2008/055605
PCT Pub. Date: May 15, 2008

(65) Prior Publication Data
US 2010/0129269 A1    May 27, 2010

(30) Foreign Application Priority Data
Nov. 8, 2006    (DE) .......................... 10 2006 052 937

(51) Int. Cl.
B01J 19/00    (2006.01)
F02M 25/10   (2006.01)
B01F 3/04    (2006.01)
B01F 5/04    (2006.01)
F23J 7/00    (2006.01)

(52) U.S. Cl. .......... 422/241; 422/129; 422/240; 261/16; 261/75; 261/76; 431/4

(58) Field of Classification Search .................. 422/129, 422/240, 241; 431/4; 261/16, 17, 75, 76
See application file for complete search history.

(56) References Cited

U.S. PATENT DOCUMENTS

| 3,257,172 A | | 6/1966 | Kao et al. |
| 3,460,924 A | | 8/1969 | O'Sullivan |
| 3,467,503 A | | 9/1969 | Juric |
| 3,600,141 A | * | 8/1971 | Mevenkamp et al. ........ 422/202 |
| 3,675,901 A | * | 7/1972 | Rion ........................... 366/174.1 |
| 3,763,796 A | * | 10/1973 | Venable, Jr. .................. 110/343 |
| 4,120,154 A | * | 10/1978 | Yokota ............................ 60/282 |
| 4,647,436 A | * | 3/1987 | Herbort et al. ................ 422/629 |
| 5,490,974 A | * | 2/1996 | Hohmann et al. ............ 422/659 |
| 6,099,922 A | * | 8/2000 | Boll et al. ..................... 428/34.4 |

(Continued)

FOREIGN PATENT DOCUMENTS
DE    1 442 740 A1    12/1968
(Continued)

*Primary Examiner* — Walter D Griffin
*Assistant Examiner* — Natasha Young
(74) *Attorney, Agent, or Firm* — Marshall & Melhorn, LLC

(57) ABSTRACT

Collecting line for removing hot process gases conducted in process gas tubes from tubular reformers, wherein the collecting line has on the inside at least one insulation layer made of fire-resistant concrete or fire-resistant brick, and on the outside a wall made of a metallic outer tube, comprises a plurality of stubs via which the process gas tubes of the tubular furnace can be connected to the collecting line, wherein in the region of the stubs, the process gas tubes are at least in part conducted in guide tubes, and each gas outlet connected to the respective process gas tube projects into the collecting line, by means of which the process gas is introduced into the collecting line in correct functioning, and at least one gas outlet is constructed as a pipe bend.

7 Claims, 1 Drawing Sheet

U.S. PATENT DOCUMENTS

2004/0037760 A1    2/2004    Fell

FOREIGN PATENT DOCUMENTS

| | | |
|---|---|---|
| DE | 1 542 530 A1 | 5/1970 |
| DE | 1 667 146 A1 | 6/1971 |
| DE | 1 667 324 A1 | 6/1971 |
| DE | 10 2006 022 898 B | 9/2007 |
| GB | 1 323 074 A | 7/1973 |
| GB | 2331258 A * | 5/1999 |

* cited by examiner

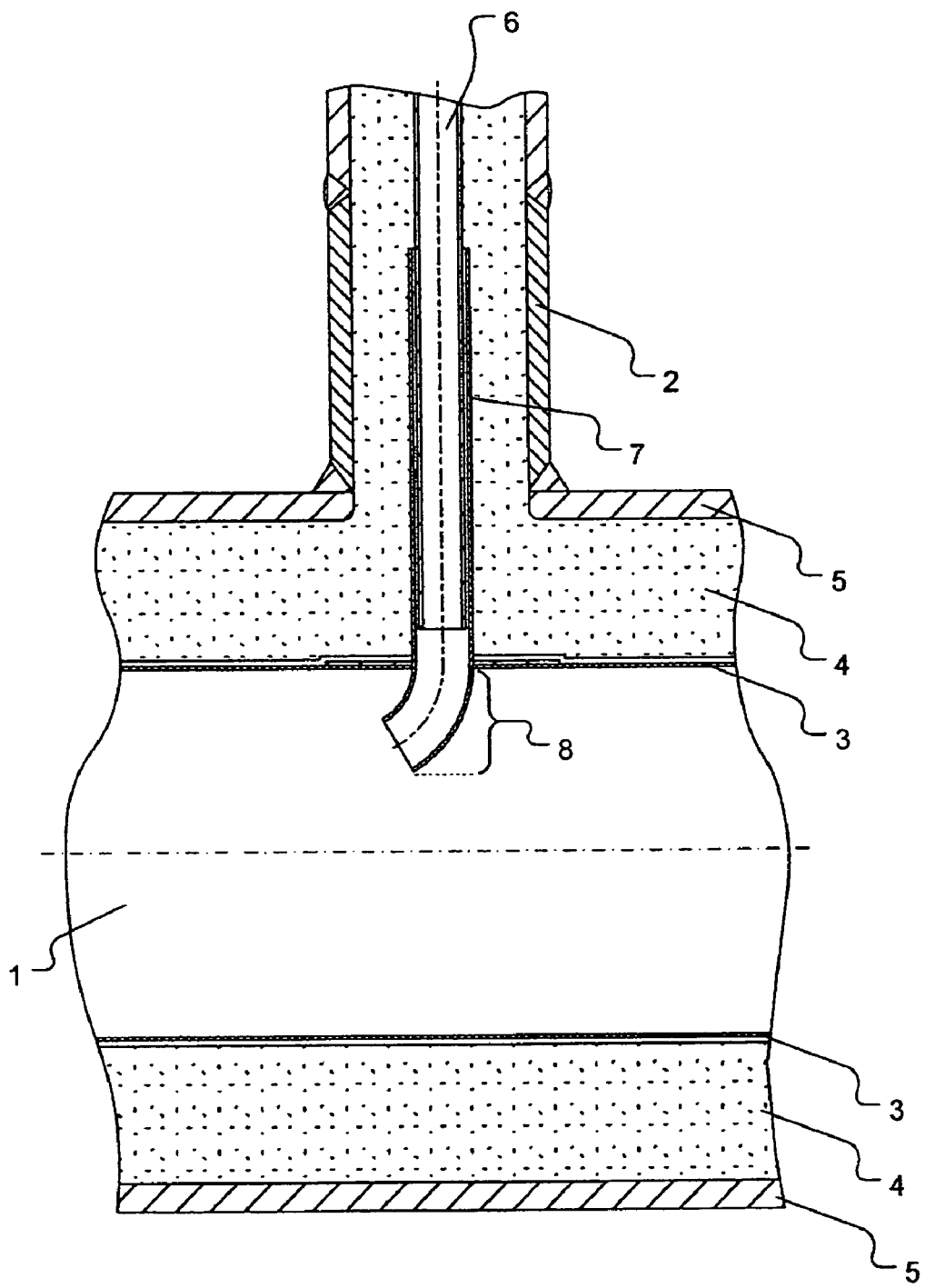

COLLECTING MAIN FOR TUBULAR CRACKING FURNACES

BACKGROUND OF THE INVENTION

The invention relates to a collecting main for the discharge of hot process gases from tubular cracking furnaces as frequently used in natural gas reforming plants for the production of synthesis gas. Such collecting main is always provided with several nozzles via which the process gas tubes of the tubular cracking furnace can be connected to the collecting main. In the area of the nozzles, the process gas tubes usually run in guide sleeves. The gas outlets of the guide sleeves or process gas tubes end in the collecting main and extend into it. Under proper operating conditions the reaction gas is introduced into the collecting main via these gas outlets, the present invention providing at least part of the outlets in the form of pipe bends. Furthermore, the invention relates to the use of such collecting mains in a tubular cracking furnace.

A plurality of tubular cracking furnaces is known which are used for the indirect heating of crackable fluids, especially for the cracking of hydrocarbons for the production of synthesis gas and/or hydrogen. In these tubular cracking furnaces a plurality of process gas tubes are arranged in the furnace chamber in the form of registers or bundles, these process gas tubes being connected to collecting mains running underneath the furnace bottom. Patent documents DE 1 542 530 B or DE 10 2006 022898 describe such tubular cracking furnaces.

As further described in DE 1 542 530 B or DE 10 2006 022898, the collecting mains consist of several layers, i.e. of at least an outer metal jacket tube, the so-called pressure jacket, which is usually made of weldable steel material and an inner insulation tube usually made of refractory brick-lining or refractory concrete. DE 1 667 324 B describes a three-layer tube as used for industrial applications. The innermost layer may consist of a metal inner tube as already suggested in DE 1 542 530 B for the area where the process gas tube penetrates into the collecting main. This inner tube serves to protect the concrete insulation from erosion caused by the process gas flow. The temperature in the collecting main ranges between approx. 800° C. and 950° C.

The thickness or insulation efficiency of the insulating layer is to be selected such that it protects the steel material of the outer or jacket tube by limiting the temperature in the outer or jacket tube to approx. 200° C. on the one hand and on the other hand by preventing the concrete from becoming too cold. Usually the stress acting upon the concrete as a result of thermal expansion processes increases the porosity of the concrete which leads to an escape of process gas from the metal inner tube which is generally not of gas-proof design. These small gas flows are also called creep flows which may convey considerable amounts of heat to the outer jacket tube where they produce local overheating.

BRIEF SUMMARY OF THE INVENTION

It is therefore the aim of the task of the present invention to prevent such effects in the collecting main and to provide an improved type of collecting main. The present invention achieves this aim by means of a collecting main for the discharge of hot process gases conveyed in process gas tubes from tubular cracking furnaces, the collecting main being provided inside with at least one insulation layer of refractory concrete or refractory brick-lining, outside with a wall of a metal outer tube, with several nozzles via which the process gas tubes of the tubular furnace may be connected to the collecting main, wherein the process gas tubes run at least partly in guide sleeves in the area of the nozzles, and one gas outlet each connected to the related process gas tube extends into the collecting main via which the process gas is introduced into the collecting main on proper operating conditions, and at least one gas outlet is provided as a pipe bend.

Surprisingly it has been discovered that, by means of the curved outlets and the consequential flow acceleration and homogenisation as well as with the associated decrease of the pressure loss in the collecting main, it was possible to notably reduce the creep flows within the insulation layer. This is due to the fact that the resulting reduced pressure loss, which involves no other advantage to the operation of the tubular cracking furnace, decreases the driving force for the creep flows due to the porosity of the insulation layer and hence also the heat amounts conveyed to the jacket tube.

Embodiments of the collecting main may either provide that the process gas tube ends in the guide sleeve and the gas outlet constitutes an extension of the guide sleeve or that the gas outlet constitutes an extension of the process gas tube, the guide sleeve being of basically cylindrical shape.

In further embodiments of the collecting main, it may be provided that the cross-sectional area of the gas outlet narrows towards its end. This will lead to higher gas velocities at the gas outlet, the bend of the gas outlet ranges between 30° and 90°, the extreme end of the gas outlet extends into the collecting main up to a maximum depth of 40% of the clear diameter of the collecting main, a metal inner tube is provided inside the collecting main.

The collecting main is used in a tubular cracking furnace. Normally a great number of collecting mains are provided which form a collecting system. To account for the different thermal influences in the centre and along the periphery of this collecting system, the various gas outlets in the individual collecting mains may be of different design, i.e. not all shaped as pipe bends or with pipe bends of different shape.

BRIEF DESCRIPTION OF THE DRAWINGS

The FIGURE shows a segment of collecting main 1 according to the present invention and a nozzle 2, which are represented in a sectional view.

DETAILED DESCRIPTION OF THE INVENTION

Nozzle 2 is arranged above collecting main 1. Collecting main 1 consists of three layers. The first layer is made up by metal inner tube 3, the second layer by insulation layer 4 which is made of refractory concrete, and the third outer layer which consists of the outer or jacket tube 5. Nozzles 2 (in this example there is only one nozzle) are arranged above collecting main 1. In the area of nozzle 2, process gas tube 6 from the furnace chamber, which is not shown, runs in a guide sleeve 7. In the example shown process gas tube 6 ends in the area of insulation layer 4 in guide sleeve 7. At its free end, guide sleeve 7 is shaped as a bend 8, the outlet opening of which points into the direction of the main flow of collecting main 1.

| List of references used | |
|---|---|
| 1 | Collecting main |
| 2 | Nozzle |
| 3 | Inner tube |
| 4 | Insulation layer |
| 5 | Outer tube |
| 6 | Process gas tube |
| 7 | Guide sleeve |
| 8 | Pipe bend |

The invention claimed is:

1. A tubular cracking furnace with collecting main for the discharge of hot process gases conveyed in process gas tubes from tubular cracking furnaces, the collecting main comprising:
   internally at least one insulation layer of refractory concrete or refractory brick-lining,
   externally a wall of a metal outer tube,
   several nozzles connecting the process gas tubes of the tubular furnace to the collecting main,
   the process gas tubes running at least partly in guide sleeves in the area of the nozzles, and
   one gas outlet connected to the related process gas tube, each gas outlet extending into the collecting main, the process gas thus being introduced from the gas tubes through the gas outlets and into the collecting main on proper operating conditions,
   wherein at least one gas outlet is provided as a pipe bend.

2. The tubular cracking furnace with collecting main according to claim 1, wherein the process gas tube ends in the guide sleeve and the gas outlet constitutes an extension of the guide sleeve.

3. The tubular cracking furnace with collecting main according to claim 1, wherein the gas outlet constitutes an extension of the process gas tube and the guide sleeve is of basically cylindrical shape.

4. The tubular cracking furnace with collecting main according to claim 1, wherein the cross-sectional area of the gas outlet narrows towards its end.

5. The tubular cracking furnace with collecting main according to claim 1, wherein the bend of the gas outlet ranges between 30° and 90°.

6. The tubular cracking furnace with collecting main according to claim 1, wherein the extreme end of the gas outlet extends into the collecting main up to a maximum depth of 40% of the clear diameter of the collecting main.

7. The tubular cracking furnace with collecting main according to claim 1, wherein a metal inner tube is provided inside the collecting main.

* * * * *